United States Patent Office 3,233,533
Patented Feb. 8, 1966

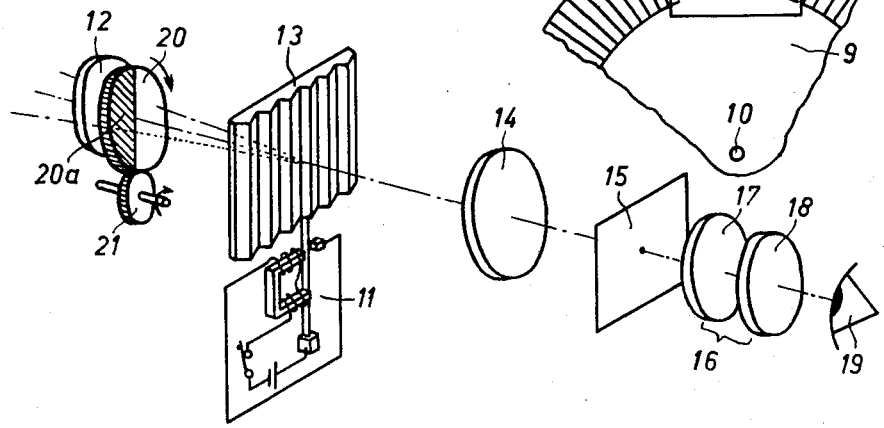
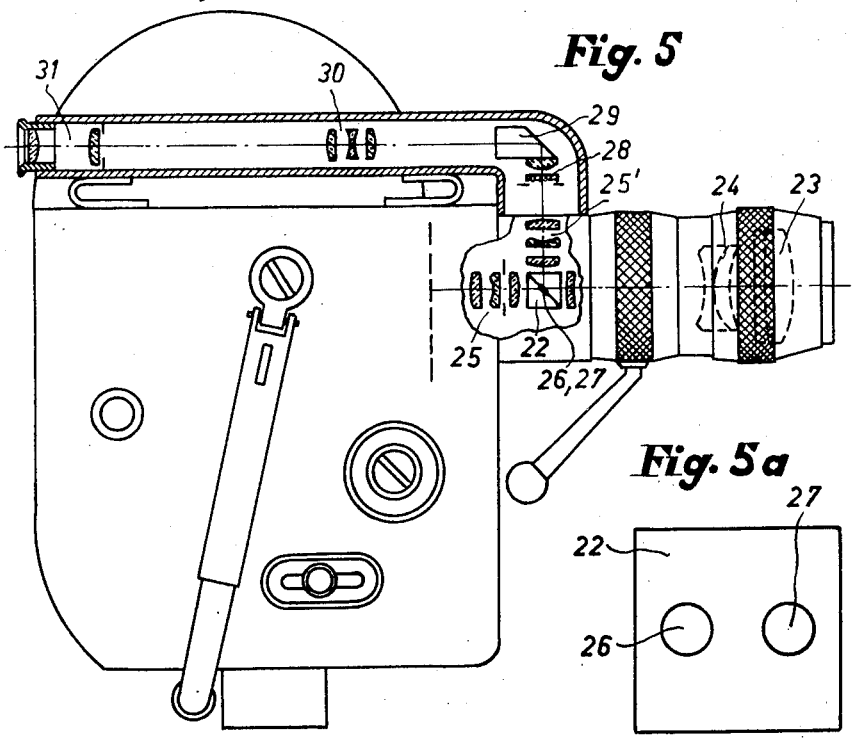

3,233,533
VIEW FINDER-RANGE FINDER FOR PHOTO-GRAPHIC CAMERAS AND MOTION PICTURE CAMERAS
Hans Sauer, Heidenheim (Brenz), Germany, assignor to Carl Zeiss, Oberkochen, Wurttemberg, Germany
Filed June 21, 1961, Ser. No. 118,633
Claims priority, application Germany, July 9, 1960,
Z 8,127
6 Claims. (Cl. 95—42)

The invention relates to a combined view finder and range finder device which is adapted for use with photographic cameras, particularly with motion picture cameras or television cameras.

Some of the miniature reflex cameras presently on the market are equipped with a combined view finder and range finder comprising a view finder objective lens and an ocular lens which together form a terrestrial telescope. In single lens reflex cameras the view finder objective lens and the camera lens are one and the same. In a small central portion of a real image plane of the aforementioned telescope there is disposed a so-called sharpness indicator comprising a pair of oppositely orientated optical wedge members disposed in abutting side by side relationship so as to form a sharp dividing line extending perpendicularly to the axis of the two wedge members through the center of the image plane and preferably parallel to the longer sides of the view finder image. During the range measurement the extension of the camera is varied as by displacement of the whole objective or of parts thereof longitudinally of the optical axis until coincidence of the two image halves viewed through the two wedge members is obtained, that is, until an adge of the image content in the lower half which projects beyond the dividing line matches precisely with its extension in the upper half of the image. In this case the method of range finding is that of a split image range finder.

The indicator field hitherto used for the range finding in single lens reflex cameras consists of only a small central portion of the total view finder image. Therefore, the range finding is limited to this small central portion of the view finder image. It is not advisable, however, to enlarge both of the wedge members to such an extent that each takes up one half of the view finder image so that suitable image edges might be used for the range finding also in outer portions of the image, because the differences in the path of travel of such rays become excessive, which travel through the wedge members at points more remote from the center of the image.

It has already been proposed to replace the two optical wedge members by a wedge screen comprising two groups of strip-shaped narrow wedges disposed parallel to each other, each group covering one half of the image field, and the two groups being orientated oppositely to each other. The image observed in the view finder and the method of range finding are the same as in a split image range finder.

It has further been proposed to locate in the real image plane of the finder a screen comprising parallel, narrow strip-like and ridge-shaped bi-prisms which cover the total area of the view finder window. In all portions of the image field, the image of an edge which extends obliquely of the longitudinal direction of the strips, such as the edge of the roof of a house, appears in each of two adjacent screen strips parallel offset if the real view finder image does not lie in the plane of the screen. The criterion indicating the completed sharpness focusing is the fact that the images of said edges disposed obliquely of the screen strips combine to form a continuous straight line. It is also possible to dispose two of said groups of bi-prism screens, staggered with respect to each other a distance equal to one half the width of a screen, in two halves of the view finder field, so that the effect described in the aforementioned optical wedge screen is now obtained along the dividing line between the two screen halves.

When such prismatic screens and bi-prismatic screens are used, the edges between individual screen elements are visible in the view finder image and impair the observation of both the artistic effect of the image and details of the latter. The adverse effect caused by the screen structure increases if the magnification with which the screen is viewed is increased. The visibility of the screen structure further depends on the magnitude of the aperture through which the view finder image is projected into the screen plane. In particular, the screen structure is clearly visible if the two areas of the pupil of the view finder objective lens, which are united by the action of the prismatic or bi-prismatic screen in a common exit pupil—and thus in the eye pupil—are distinctly separated from each other and the screen system receives no light rays coming from the space between the two pupil areas.

It is an object of the invention to produce a combined view finder and range finder device in which screen elements of the aforementioned nature are disposed in a plane in which a real image of the object to be photographed is produced whereby the screen elements being subjected to reciprocating or rotational movement within said plane. In this manner the judgment of the image appearing in the view finder is not impaired by any screen structure which covers the view finder field. The oscillating movement preferably takes place in the direction of the dividing line between the two screen groups, so that the relative position of the dividing line with respect to the boundaries of the view finder field remains unchanged. As to the frequency and amplitude of the movement, no critical limit has been found for ensuring the invisibility of the screen structure. An amplitude of the movement in the range comprising one or several screen elements, and a frequency of 15 to 20 c.p.s. is already sufficient to satisfactorily suppress the visibility of the screen structure, as the time during which the screen is in the apex of the oscillation and therefore each time approximately at the same location in the field of view is insignificant as compared to the duration of the movement.

In a bi-prismatical screen, the movement of the screen in its plane according to the invention has a further important result. Light rays coming from every point of the view finder field arrive in quick sequence at the eye of the observer, which light rays were deflected by the ridge areas of the prisms in non-uniform manner so as to originate from different portions of the entrance pupil of the view finder objective lens. When the frequency and the amplitude of the movement are made great enough to permit fusion, then two partial images will appear in the view finder frame which are superimposed in the same manner as in a coincidence view fined in which the union of two partial groups of light rays is accomplished by means of a semi-transparent and semi-reflecting mirror.

As compared to the known method of range finding according to the principle of image coincidence, the present solution results in a compact and simple structure and affords the further advantage of increased brightness, since in semi-transparent mirror coatings light losses through absorption will be inevitable. A further advantage, also as compared with a range finder based on the coincidence principle and having semi-transparent interference mirrors, resides in the fact that an equal brightness of the two partial images is easily obtainable. For this purpose it is only necessary to provide ridge areas of equal width. In general, the coincidence principle as compared with the split image principle has the well known advantage that the range finding is not depending on edges and lines appearing in the image and which extend beyond a dividing line, but this observation may be carried out at any desired point in the image field covered by the screen.

According to another object of the invention, the reciprocating oscillating movment with uniform amplitude of the screen may be replaced by an oscillating movement of such nature that reversing positions of the screen, in which the screen structure is dispsed at the same location in the range finder field, occur only between extended intervals of time. This is easily accomplished by a movement having a varying amplitude. In this manner the visibility of the screen structure is even more thoroughly suppressed. When the screen is disposed in an annular zone of a disc, the same effect of the invention may be obtained by rotating the disc about its center.

A still further object of the invention resides in the combination of a moving bi-prismatic screen disposed in the image plane of the view finder with a device interposed in the path of the light rays and adapted to alternately block each one of said partial image forming light ray groups, at a location where these groups are still separated, and with a frequency well below the frequency required for fusion, such as about 5 c.p.s. A suitable device may comprise a rotating disc provided with transparent and non-transparent sectors of equal area. Thus the parallactic differences in the position of the two partial images will be observable in the form of a parallactic rocking movement which furnishes a particularly distinct criterion for sharp focusing.

According to still another object of the invention, a moving bi-prismatic screen disposed in the image plane of the view finder is combined wth a device adapted to alternately interpose into said light ray groups, at a location in the light ray path of the view finder where the same are still separated, filters of different color. When the change of the filters, such as for instance a red filter and a complementary blue-green filters, is effected with a frequency well below the frequency required for fusion, the effect of the parallactic movement will be further emphasized in that a color flicker occurs at the edges which disappears only after the sharp-focusing has been completed.

With these and other objects in view, as will appear hereinafter, the invention will now be described in more detail with reference to the accompanying drawings, in which:

FIG. 1a is a perspective view of a prism structure comprising two oppositely disposed optical wedge screens for a range measurement based on the split image principle;

FIG. 1b illustrates the image appearing in the view finder. Reference numeral 1 designates the screen plate having a clearly visible screen structure. Reference numeral 2 indicates the frame of the view finder, line 3 is the dividing line between the two groups of screens, 4a and 4b are the parallactically displaced portions of the image of an edge extending perpendicularly to the dividing line, 5 is the image of a further edge which extends obliquely of the dividing line and is not suitable for the range finding as it lies entirely within the upper half of the view finder image;

FIGS. 2a to 2d correspondingly illustrate the conditions when a bi-prismatical screen is used. Corresponding reference numerals are used to designate the corresponding details of the FIGS. 1a to 1d;

FIG. 2a is a perspective view of a bi-prismatical screen;

FIG. 2b illustrates an image obtained with a stationary screen and prior to the completed sharp focusing respectively for an edge disposed parallel (6) and oblique (7a and 7b) to the screen strips;

Figure 1A:
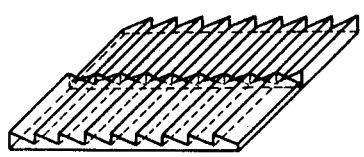
FIG. 1c illustrates the change in the image occurring when a device is inserted which causes a reciprocating oscillating movement of the screen. The screen structure has disappeared.
FIG. 1d illustrates the image obtained upon completion of the sharp-focusing.
Figure 1B:
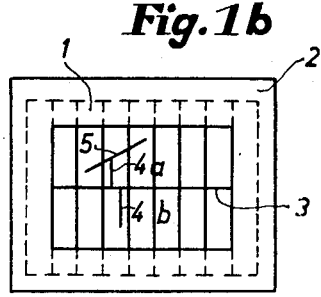
Figure 1C:
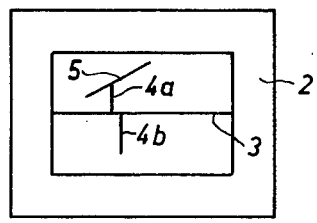
Figure 1D:
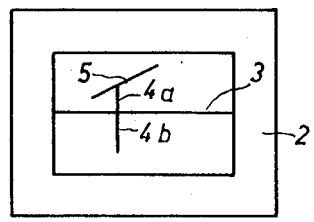
Figure 2A:
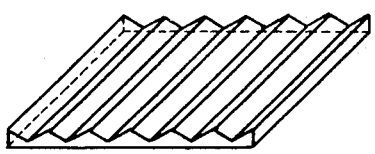
Figure 2B:
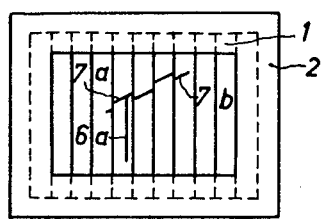
Figure 2C:
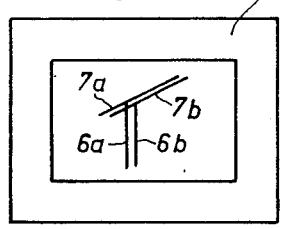
Figure 2D:
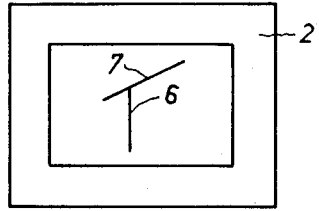

FIG. 2c illustrates the image obtained with a moving screen. As in any range finder based on the coincidence principle, there will appear two parallactically offset partial images comprising the vertical edges 6a and 6b and the oblique edges 7a and 7b;

FIG. 2d illustrates the image obtained upon completion of the sharp focusing, in which the previously offset partial images comprising the edges 6 and 7 coincide;

FIG. 3 illustrates by way of example an embodiment of the type in which a bi-prismatic screen is disposed in an annular zone on a disc 9 which rotates with uniform speed about an axis 10. Thus the reversal positions during the movement of the screen are avoided in which the screen structure might still be visible;

FIG. 4 is a diagrammatical view of a screen plate disposed in the path of rays of a view finder in which the screen plate is oscillated by an electro-magnetic oscillator 11. Reference numeral 12 designates the view finder objective lens, 13 the screen plate, 14 an inverting lens system, 15 a view finder frame, 16 an ocular lens comprising field lens 17 and eye lens 18 and adapted to produce a view finder image that is upright and free of visible screen structure. Reference numeral 19 indicates the eye of the observer. Reference numeral 20 designates a rotating shutter which alternately blocks each one of the two partial groups of rays of the view finder, which are still separate, with a frequency of about 5 c.p.s. The drive is designated by reference numeral 21. In the case that the rotating shutter is composed in its two halves of filters, 20 being a red filter and 20a being a blue-green filter, the effect of color flicker will be produced;

FIG. 5 illustrates diagrammatically the location of a screen plate interposed in the path of light rays of a small film motion picture camera for the purpose of serving as a sharpness indicator, the light rays being directed through a dividing cube 22 interposed in the path of rays of the objective lens. The objective lens comprises a front portion 23, a central portion 24 and a rear portion 25. In the illustrated embodiment, the diagonal surface of the dividing cube 22 does not consist of the customary all over semi-transparent mirror layer, but consists merely of two small mirror layers 26, 27, as may be seen from FIG. 5a which is a plan view in the direction of the incoming light from the front lens side of the objective. The position of these layers is such that they are projected, owing to the effect of the screen plate, into the common exit pupil of the view finder, while the remaining portions of the diagonal surface are completely transparent so that only a minor loss of light occurs in the path of light rays directed to the film. Reference numeral 25' designates the rear portion of the finder lens system which projects a sharp image of the object to be photographed into the coincidence plane of the prism structure 28. This image is inverted by means of the prism 29 and the inverting system 30 and may be viewed in the ocular image plane of the ocular lens 31. Preferably, the two mirror layers 26 and 27 are arranged so far outside the optical axis of the camera objective that the view finder receives only light rays of an aperture which is larger than 1:8.

The method and means for producing the reciprocating oscillating movement of the means employed as sharpness indicator form no part of the invention. This movement may be effected by means of a mechanical or electromechanical oscillator of known structure. In motion picture cameras the drive for transporting the film, such as a spring or electric motor, may be used to ensure the oscillating movement of the screen. In cameras in which the diaphragm of the objective lens is variable by means of a control motor responsive to an exposure meter, suitable mechanical transfer means may be provided so as to use the control motor to obtain the desired reciprocating oscillating movement. In the latter case, the additional advantage will be obtained that the screen structure will be visible in its rest position but will disappear upon energizing of the exposure meter device so that the disappearing of the screen structure will serve as indication that the exposure meter device is operating.

What I claim is:

1. The combination with the objective of a photographic camera, of a view finder and range finder including a finder objective, an image reversing means and an ocular forming a terrestrial telescope, prism elements arranged in a plane in coincidence with a plane in said view finder in which a real image of the object to be photographed is formed, said prism elements covering the entire image field, and means for moving said prism elements within said plane in a predetermined direction with such a speed that a fused image is obtained in said view-finder with the result that the screen structure of said prism elements is not noticeable to the observer's eye over the entire image field.

2. The combination with the objective of a photographic camera, of a view finder and range finder including a finder objective, an image reversing means and an ocular forming a terrestrial telescope, prism elements arranged in a plane in coincidence with a plane in said view finder in which a real image of the object to be photographed is formed, said prism elements covering the entire image field, and means for moving said prism elements within said plane with such a speed that the screen structure of said prism elements is not noticeable to the observer's eye, said prism elements comprise a plurality of roof-shaped bi-prisms having parallel roof edges and which cover the image field of the view finder.

3. The combination with the objective of a photographic camera, of a view finder and range finder including a finder objective, an image reversing means and an ocular forming a terrestrial telescope, prism elements arranged in a plane in said view finder in coincidence with a plane in which a real image of the object to be photographed is formed, said prism elements covering the entire image field, and means for moving said prism elements within said plane with such a speed that the screen structure of said prism elements is not noticeable to the observer's eye, said prism elements comprise a plurality of roof-shaped bi-prisms having parallel roof edges and which cover the image field of the view finder, said means for moving said prism elements performing an oscillating movement of the latter in a direction at right angles to the direction of said roof edges.

4. The combination with the objective of a photographic camera, of a view finder and range finder including a finder objective, an image reversing means and an ocular forming a terrestrial telescope, prism elements arranged in a plane in said view finder in coincidence with a plane in which a real image of the object to be photographed is formed, said prism elements covering the entire image field, and means for moving said prism elements within said plane with such a speed that the screen structure of said prism elements is not noticeable to the observer's eye, said prism elements comprise a plurality of roof-shaped bi-prisms having parallel roof edges and which cover the image field of the view finder, said means for reciprocating said prism elements for movement of said prism elements in a direction at right angles to the direction of said roof edges.

5. The combination with the objective of a photographic camera, of a view finder and range finder including a finder objective, an image reversing means and an ocular forming a terrestrial telescope, prism elements arranged in a plane in coincidence with a plane in said view finder in which a real image of the object to be photographed is formed, said prism elements covering the entire image field, means for moving said prism elements within said plane with such a speed that the screen structure of said prism elements is not noticeable to the observer's eye, and means including two mirror surfaces which are substantially smaller than said image field for reflecting the light entering said objective into the light path of said view finder, said two mirror surfaces being arranged in a common inclined plane.

6. The combination with the objective of a photographic camera, of a view finder and range finder including a finder objective, an image reversing means and an ocular forming a terrestrial telescope, prism elements arranged in a plane in coincidence with a plane in said view finder in which a real image of the object to be photographed is formed, said prism elements covering the entire image field, means for moving said prism elements within said plane with such a speed that the screen structure of said prism elements is not noticeable to the observer's eye, and means including two mirror surfaces which are substantially smaller than said image field for reflecting the light entering said objective into the light path of said view finder, said two mirror surfaces being arranged in a common inclined plane and so far outside the optical axis of said objective that said view finder receives only light rays of an aperture larger than 1:8.

References Cited by the Examiner

UNITED STATES PATENTS

| | | | |
|---|---|---|---|
| 2,588,373 | 3/1952 | Erban | 88—57 |
| 2,914,997 | 12/1959 | Grey | 95—42 |
| 2,986,599 | 5/1961 | Lindner | 95—44 X |
| 3,003,407 | 10/1961 | Grey | 95—44 |
| 3,016,785 | 1/1962 | Kapany | 88—1 |

OTHER REFERENCES

German printed application 1,083,119, June 9, 1960.

JOHN M. HORAN, *Primary Examiner.*

NORTON ANSHER, *Examiner.*